(12) United States Patent
Kammerstetter et al.

(10) Patent No.: US 12,431,515 B2
(45) Date of Patent: Sep. 30, 2025

(54) SEPARATION SYSTEM FOR A FUEL CELL SYSTEM

(71) Applicant: AVL LIST GMBH, Graz (AT)

(72) Inventors: Heribert Kammerstetter, Salzburg (AT); David Bischof, Graz (AT); Christoph Kuegele, Graz (AT); Joachim Fischer, Graz (AT); Otfried Derschmidt, Graz (AT)

(73) Assignee: AVL LIST GMBH, Graz (AT)

( * ) Notice: Subject to any disclaimer, the term of this patent is extended or adjusted under 35 U.S.C. 154(b) by 610 days.

(21) Appl. No.: 17/796,877

(22) PCT Filed: Feb. 3, 2021

(86) PCT No.: PCT/AT2021/060040
§ 371 (c)(1),
(2) Date: Aug. 2, 2022

(87) PCT Pub. No.: WO2021/155415
PCT Pub. Date: Aug. 12, 2021

(65) Prior Publication Data
US 2023/0058650 A1 Feb. 23, 2023

(30) Foreign Application Priority Data
Feb. 4, 2020 (AT) .............................. A 50087/2020

(51) Int. Cl.
*H01M 8/04119* (2016.01)
*B01D 19/00* (2006.01)
(Continued)

(52) U.S. Cl.
CPC .... *H01M 8/04164* (2013.01); *B01D 19/0042* (2013.01); *B01D 19/0063* (2013.01); *B01D 46/003* (2013.01); *G01F 1/66* (2013.01)

(58) Field of Classification Search
CPC .......... H01M 8/04164; H01M 8/04156; B01D 19/0042; B01D 19/0063; B01D 46/003;
(Continued)

(56) References Cited

U.S. PATENT DOCUMENTS 4,860,591 A 8/1989 Garland
6,053,039 A 4/2000 Karvinen
(Continued)

FOREIGN PATENT DOCUMENTS

CN 201194242 Y 2/2009
CN 101929884 B 5/2012
(Continued)

*Primary Examiner* — Duane Smith
*Assistant Examiner* — Phillip Y Shao
(74) *Attorney, Agent, or Firm* — Norman B. Thot

(57) ABSTRACT

A separation system for a fuel cell system. The separation system includes a first container with an open top to separate a liquid from a liquid-gas mixture, a second container with an open top, a measuring tube, and a flow meter. The first container includes an inlet to supply the liquid-gas mixture, a first upper outlet to discharge the gas, a second lower outlet to discharge the liquid, and a first container bottom. The second container includes an inlet, a drain with an outlet opening, and a second container bottom. The measuring tube fluidically connects the second lower outlet to the inlet into the second container. The flow meter measures a flow in the measuring tube between the first and second container geodetically below the outlet opening. The outlet opening of the drain is arranged geodetically above the first container bottom and above the second container bottom.

15 Claims, 2 Drawing Sheets

(51) Int. Cl.
*B01D 46/00* (2022.01)
*G01F 1/66* (2022.01)

(58) Field of Classification Search
CPC . G01F 1/66; G01F 22/00; G01F 15/08; Y02E 60/50
See application file for complete search history.

(56) References Cited

U.S. PATENT DOCUMENTS

| | | | |
|---|---|---|---|
| 2006/0278016 A1* | 12/2006 | Froehlich | G01N 29/032 73/149 |
| 2013/0139694 A1* | 6/2013 | Hughes | C02F 1/20 96/174 |
| 2015/0033871 A1 | 2/2015 | Smith | |
| 2016/0008742 A1* | 1/2016 | Adler | G01F 15/08 700/282 |
| 2018/0205100 A1 | 7/2018 | Hosoi et al. | |
| 2018/0241060 A1 | 8/2018 | Harbusch et al. | |
| 2018/0342745 A1* | 11/2018 | Reeh | B60L 50/72 |
| 2019/0196518 A1 | 6/2019 | Horoba et al. | |

FOREIGN PATENT DOCUMENTS

| | | |
|---|---|---|
| CN | 106237659 A | 12/2016 |
| CN | 108448135 A | 8/2018 |
| DE | 101 02 188 A1 | 7/2002 |
| DE | 197 81 704 B4 | 1/2007 |
| DE | 10 2009 027 798 A1 | 1/2011 |
| DE | 10 2011 116 679 A1 | 4/2013 |
| DE | 10 2012 023 682 A1 | 6/2014 |
| DE | 10 2016 116 989 A1 | 3/2018 |
| FR | 2 610 105 A1 | 7/1988 |
| JP | S52-62572 U | 5/1977 |
| JP | S52-149147 U | 11/1977 |
| JP | S56-52008 U | 5/1981 |
| JP | 63-210622 A | 9/1988 |
| JP | 9-304132 A | 11/1997 |
| JP | 2000-302402 A | 10/2000 |
| JP | 2006-292380 A | 10/2006 |
| JP | 2008-43855 A | 2/2008 |
| JP | 3154627 U | 9/2009 |
| WO | WO 2017/037197 A1 | 3/2017 |

* cited by examiner

SEPARATION SYSTEM FOR A FUEL CELL SYSTEM

CROSS REFERENCE TO PRIOR APPLICATIONS

This application is a U.S. National Phase application under 35 U.S.C. § 371 of International Application No. PCT/AT2021/060040, filed on Feb. 3, 2021 and which claims benefit to Austria Patent Application No. A50087/2020, filed on Feb. 4, 2020. The International Application was published in German on Aug. 12, 2021 as WO 2021/155415 A1 under PCT Article 21(2).

FIELD

The present invention relates to a separation system for a fuel cell system having a first container open at the top for separating a liquid from a two-phase mixture, an inlet via which the two-phase mixture can be supplied, a first, upper outlet via which the gas can be discharged and a second, lower outlet via which the liquid can be discharged, and a second container open at the top and having a drain.

BACKGROUND

Fuel cell systems are used both in home heating appliances and in mobile applications, such as for generating electricity to drive an electric motor of an electrically powered motor vehicle.

In the operation of PEM fuel cells, water content is a critical parameter. The water or water vapor produced during the reaction at the cathode must be discharged to prevent condensation and wetting of the catalyst surface, the power density of the fuel cell is otherwise reduced. Liquid water also prevents gas transport in the diffusion layer, while the ionic conductivity of the membrane increases with the water content. The water formed initially accumulates on the cathode side during the reaction, but also partially reaches the anode side, since the water vapor or water formed on the cathode partially diffuses through the membrane or passes through the membrane due to the dipole properties of the water molecules.

For stable cell operation in the range of maximum power density, it is accordingly necessary to optimize the water balance of the cell, for which in turn the amount of condensed water produced both at the cathode and at the anode must be determined.

A separation system must therefore be provided for fuel cell systems, in particular PEM fuel cell systems, in order to split the two-phase mixture comprising water and water vapor contained in the cathode circuit, anode circuit and/or exhaust gas stream into the components gas and condensate and to determine the amount of condensate produced per unit time.

A gas separator in which the water or liquid produced is discharged is described in DE 10 2016 116 989 A1. The gas separator in the form of a measuring tube is supplied with a multiphase medium which flows in a measuring tube over a weir, defining a shallow water area over which the gas is separated from the liquid. An upper opening is provided on the measuring tube to discharge the gas, while the liquid continues to flow downstream of the weir along an inclined plane to the liquid outlet, where a flow meter is located to determine the liquid flow rate.

This gas separator is not, however, suitable for a fuel cell system because the condensate is not continuously produced, i.e., there is not a continuous flow at the flow meter so that either no liquid is present in some cases or emptying must be discontinuous.

SUMMARY

An aspect of the present invention is to provide a separation system with which the accumulating condensate quantities can be measured continuously and accurately and which requires as little space as possible.

In an embodiment, the present invention provides a separation system for a fuel cell system. The separation system includes a first container which is open to a top for separating a liquid from a two-phase mixture, a second container which is open at a top, a measuring tube, and a flow meter. The first container comprises an inlet via which the two-phase mixture is suppliable, a first upper outlet via which a gas is dischargeable, a second lower outlet via which a liquid is dischargeable, and a first container bottom. The second container comprises an inlet, a drain which comprises an outlet opening, and a second container bottom. The measuring tube fluidically connects the second lower outlet of the first container to the inlet into the second container. The flow meter is configured to measure a flow in the measuring tube between the first container and the second container geodetically below the outlet opening. The outlet opening of the drain of the second container is arranged geodetically above the first container bottom and above the second container bottom.

BRIEF DESCRIPTION OF THE DRAWINGS

The present invention is described in greater detail below on the basis of embodiments and of the drawings in which.

DETAILED DESCRIPTION

Figure 1:
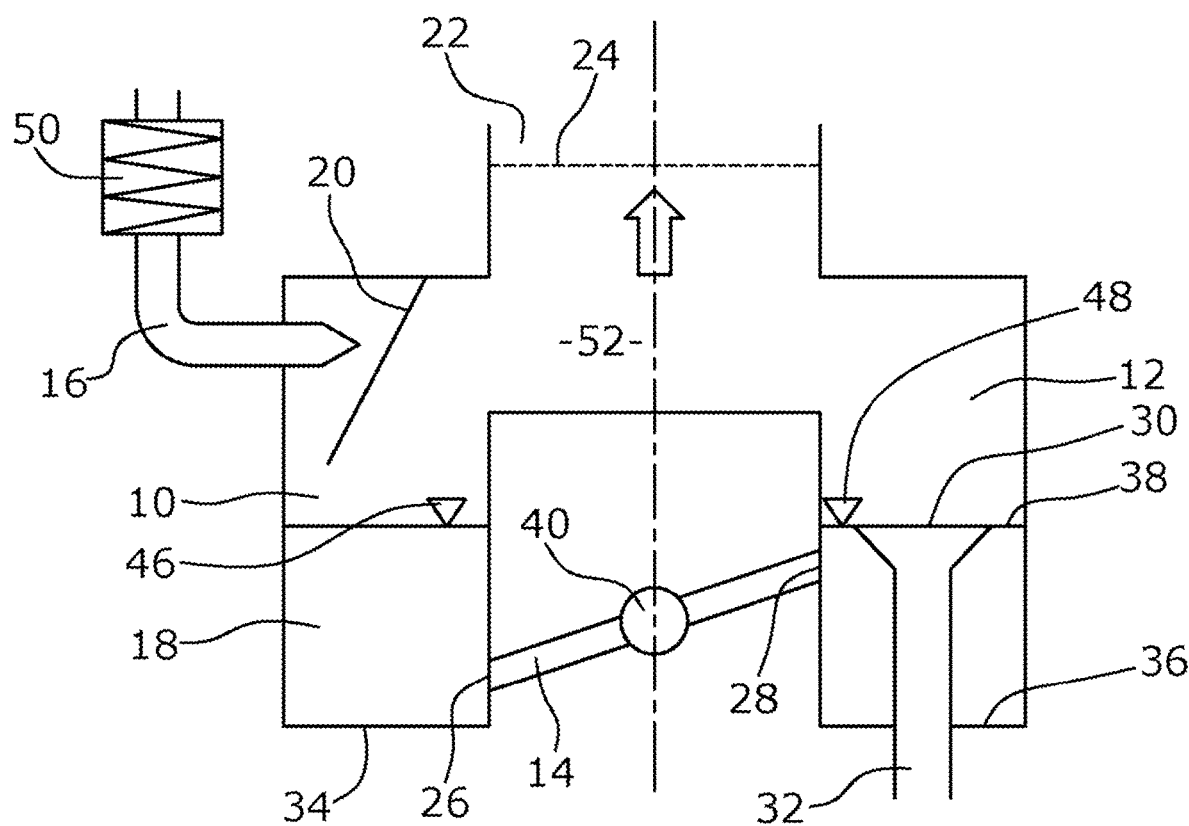
FIG. 1 shows a schematic drawing of a separation system according to the present invention in a side view.

The separator system comprises two containers which are connected to one another via a measuring tube and are open at the top, they are therefore communicating vessels in which the liquid level is always the same. The liquid level is thus always on an equipotential line in both containers at least as long as a discharge of the liquid quantity from the first container or from the second container, respectively, is possible as fast as the supply of the liquid into the corresponding container. The terms top, bottom, upper, lower, above or below are thus defined according to the gravitational potential or in relation to the center of the earth, respectively. An equal height accordingly means an arrangement on an equipotential line of gravity. Geodetical upper outlet accordingly means an outlet which has a further distance from the center of the earth than a lower outlet. The definition above a bottom outlet thus means that the distance to the center of gravity of the earth is greater than the distance of the bottom outlet to the earth, i.e., that the gravitational potential is less than at the bottom. A multiphase mixture accordingly flows via an inlet into a first container open at the top. In this container, separation of the liquid from the multiphase mixture takes place. The gas is discharged via a first, geodetically upper outlet, while the liquid flows via a second, lower outlet into a measuring tube and from there into a second, upwardly open container, in which a drain is provided whose outlet opening is arranged geodetically above a bottom of the first container and above a bottom of the second container. The second outlet of the first container is thus fluidically connected to an inlet of the second container via a measuring tube. According to the present invention, a measuring device or the necessary sensors of a measuring device is arranged geodetically on the measuring tube or in the measuring tube below the outlet opening, which measures a flow in the measuring tube between the first container and the second container. It is not essential that the entire measuring device comprises a direct mechanical connection to the measuring tube and is arranged below the outlet opening, but that the liquid flow in the measuring tube itself is measured below the outlet opening via the measuring device. The flow meter is accordingly used to measure the flow in the measuring tube below the outlet opening so that the measurements are made geodetically below the outlet opening, whereby the flow meter always measures in the area through which the liquid flows. This means that even small flows can be measured, since the entire cross-section is always flowed through. The separator system must be filled up to the outlet opening once. Once this has been done, all subsequent flow processes are recorded by the measuring device, since this flow will always be complete from the first container to the second container, and from there to the drain. Very accurate measurements are thus possible in a small space even for small amounts of condensate, which can be carried out continuously.

The measuring device can, for example, be an ultrasonic sensor, which in this case can also measure flows of transparent substances regardless of the ambient conditions. The measurement is furthermore contactless so that the flow is not influenced.

The inlet to the first container is advantageously arranged geodetically above the outlet opening of the drain in the second container. The multiphase mixture must accordingly flow along an open area not filled with liquid in which the two phases are well separated from each other due to sliding along the surface.

To further enhance this separation, an inclined plane is configured geodetically above the outlet opening of the second container in the first container below the inlet, sloping down from the inlet toward the second outlet. The distance along which the multiphase mixture slides above the liquid column is accordingly extended, thus increasing the separation efficiency.

The measuring tube can, for example, be configured to rise from the first container to the second container, thus achieving additional degassing.

It is furthermore advantageous if a net, screen or mesh is arranged at the first outlet of the first container, which serves to prevent larger droplets in the gas from leaving the separation system via the first outlet.

Particularly little space is required if the first container is arranged concentrically to the second container so that the two containers are correspondingly arranged radially inside one another. This also reduces material costs, as less material is required since the outer wall of the inner container simultaneously defines the inner wall of the outer container.

In a further configuration, the second container is arranged radially within the first container so that the inlet can still be easily accessed and connected. The inclined plane can furthermore be configured as a simple spiral between the two lateral surfaces of the containers, thus providing a good separation efficiency.

The measuring tube thus extends with its downstream end through the first container to the inlet of the second container. This provides short connections with low inertial delays during measurement.

It is also advantageous if a geodetical lower portion of the outlet opening is configured to be non-continuous. In the case of an outlet opening formed on an equipotential line, there is a risk that surface stresses will cause slightly different filling heights, which would falsify the measurement. This is prevented by the non-continuous design, since it does not generate an equal surface tension extending over the circumference.

This non-continuous design is particularly easy to produce by arranging one edge of the outlet opening on an equipotential line which is interrupted by at least one groove.

In a further embodiment, a first level sensor is arranged in the first container. Via the level sensor, an error due to the delay in the build-up and reduction of the pressure difference, in this case between the two containers, which causes the flow in the measuring tube, can be calculated out during a continuous flow measurement. The stored volume in the first container calculated from the height difference can, for example, be added to the measured values of the flow meter therefor.

To provide that the volume in the second container corresponds to the level up to the outlet opening, a level sensor can also be arranged in the second container so that the actual volume difference is always added up.

To prevent the first container from overflowing into the environment and thus causing damage, an overflow is provided between the first and second containers, which is arranged geodetically above the outlet opening of the second container. If an excessive amount of condensate occurs that can no longer be discharged via the measuring tube, it can accordingly be reliably discharged via the outlet of the second container.

A further improvement of the measured values can be achieved by arranging a heat exchanger for conditioning upstream of the second container. This heat exchanger, which can be configured as a cooler (in particular as a simple cooler), serves to achieve additional condensation in the two-phase mixture so that a larger proportion of water can be separated in the liquid state. This enables more accurate information to be obtained on the amount of water present in the system.

A separation system for a multiphase mixture is thus provided with which high separation rates can be achieved and accurate condensate quantity measurements or condensate flow rates can be continuously measured. When used in a fuel cell system, this facilitates statements on the water balance and thus on the achievable power density of the fuel cell system.

An embodiment of a separation system according to the present invention, which is suitable for a fuel cell system but also for other multiphase mixtures such as natural gas/water mixtures, is shown schematically in the drawings and is described below.

The separation system according to the present invention shown in FIG. 1 consists of a first container 10 which is open at the top and a second container 12 which is open at the top, which containers 11, 12 are connected to each other via a measuring tube 14.

The first container 10 comprises an inlet 16, via which, for example, when the separation system is used for a fuel cell system, a two-phase mixture 17, consisting of air, oxygen, hydrogen and water, which is present in liquid phase, flows into the first container 10. The water in this case is a condensate 18 which is formed during the chemical reactions in the fuel cell and is at least partially discharged from the fuel cell. This two-phase mixture 17 flows on the surface along a plate formed as an inclined plane 20, at which the two phases can separate from each other. The gas can escape upwardly through a first, upper outlet 22, but to which a fine mesh screen, sieve or net 24 is attached to provide that no droplets from the gas are drawn along to the first, upper outlet 22, as these would drop off the net 24 and flow back into the first container 10.

The liquid, or condensate 18 collects in the first container 10 and flows into the measuring tube 14 via a second outlet 26 arranged in the lower region of the first container 10 and into the second container 12 via an inlet 28 of the second container 12 until a level compensation between the two containers 10, 12 is established. This equalization accordingly functions via the principle of communicating containers, between which there is always an equalization of the filling levels, i.e., which are always filled up to a common equipotential level. The filling level is in this case determined by an outlet opening 30 of a drain 32 from the second container 12, whereby it is necessary for the level compensation that a first bottom 34 of the first container 10 and a second bottom 36 of the second container 12 are arranged geodetically below the outlet opening 30.

The fluid will now always seek to equalize with respect to the fill levels between the two containers 10, 12, while this fill level is always the same, i.e., corresponds to the plane spanned by an edge 38 of the outlet opening 30, unless the volumetric throughflow of condensate into the first container 10 is greater than the maximum volumetric throughflow that can flow through the measuring tube 14. If this is not the case, the volumetric throughflow in the measuring tube 14 is equal to the volumetric flow of condensate into the first container 10. The volumetric throughflow in the measuring tube 14 is accordingly measured by a flow meter 40, which in the present embodiment is configured as an ultrasonic device with two sensors 42, 44 attached to the measuring tube 14.

In the event that continuous measurements are to be made very quickly so that time intervals must be considered in which the level equalization between the two containers may not yet have taken place, a first level sensor 46 is arranged in the first container 10 and a second level sensor 48 is arranged in the second container 12. Their measured values can be used in addition to the measured values of the flow meter 40 since the difference between the two level sensors 46, 48 corresponds to a volume which must have additionally flowed to the container in the corresponding second unit. The time delay due to the reduction and build-up of the level difference can accordingly be compensated by adding the volume calculated therefrom to the integral of the flow meter 40, so that the total volume flown to during the time interval is calculated as the result.

FIG. 1 also shows a preconditioning of the two-phase mixture 17 via a heat exchanger 50, which is arranged upstream of the inlet 16, but which may also be arranged in the first container 10 or at its second outlet 26. This heat exchanger 50 serves to separate additional water from the two-phase mixture which is still present as water vapor in order to allow a more accurate water balance at the fuel cell.

The separation system also comprises an overflow 52 via which the condensate 18 can flow from the first container 10 into the second container 12 and from there to the drain 32 if the volumetric throughflow is too high. This prevents the first container 10 from overflowing.

Figure 2:
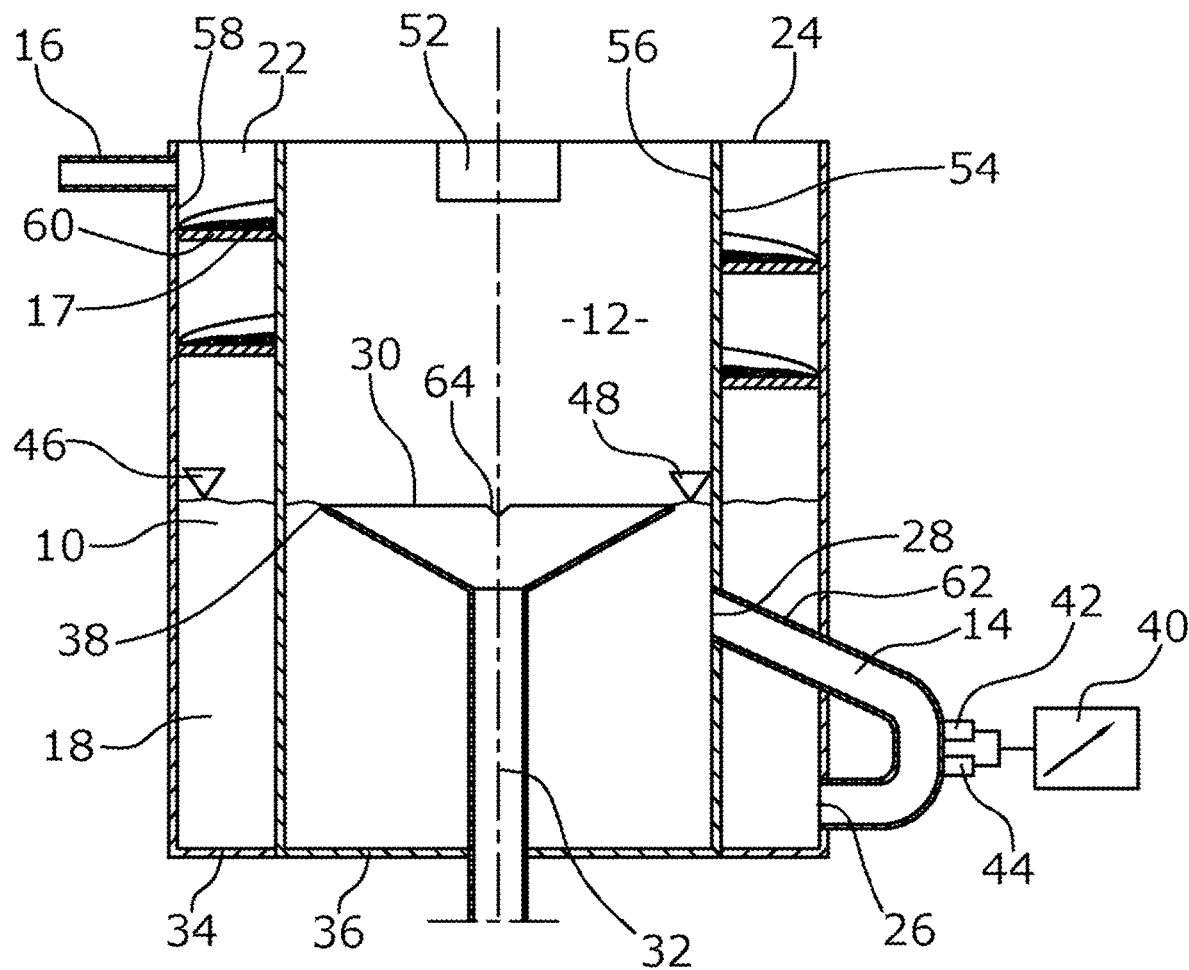
FIG. 2 shows a side view of an embodiment according to the present invention of a separation system according to the present invention in a sectional view.

FIG. 2 shows such a separation system with regard to a possible constructional design. The two open containers 10, 12 are arranged concentrically to each other so that the first container 10 radially surrounds the second container 12, while the two containers 10, 12 comprise a common bottom 34, 36 and an inner circumferential surface 54 of the first container 10 corresponds to an outer circumferential surface 56 of the second container 12. Between the inner circumferential surface 54 of the first container 10 and an outer shell surface 58, a spirally extending inclined plane 60 is configured which is geodetically located above the outlet opening 30 of the second container 12 so that only a flat film slides along the inclined plane 60 at any one time when the two-phase mixture 17 is supplied, resulting in a good separation of the gas from the condensate 18.

The measuring tube 14 extends outwardly from the second outlet 26 in the lower region of the first container 10, where measurement is made by the flow meter 40, and through the outer shell surface 58 of the first container 10 and through the first container 10 to the inner circumferential surface 54 of the first container 10 and outer circumferential surface 56 of the second container 12, respectively, in which an opening serving as an inlet 28 is configured so that a downstream end 62 of the measuring tube 14 extends through the first container 10. The measuring tube 14 is configured to rise from the first container 10 to the second container 12, thereby preventing undissolved gases from becoming trapped in the measuring tube 14.

It can additionally be seen in FIG. 2 that a groove 64 is configured on the edge 38 of the outlet opening 30, but that this groove 64 is not large enough to serve as an outlet opening, but merely disturbs the surface tension in the plane of the outlet opening 30 so that a higher level does not result in the second container 12 due to the surface tension.

The present separation system allows the amount of condensate produced in a fuel cell system to be determined very accurately and continuously on both the cathode side and the anode side. Such a system can also be used on the exhaust gas side. The separation system is featured by its small design, high separation efficiency, and accurate measurement values. The power density of a fuel cell can be increased via these results.

It should be clear that the scope of protection of the present invention is not limited to the described embodiment. Such a separation system can in particular be used not only in fuel cell systems, but also, for example, in other fields where two-phase mixtures must be separated into a liquid and a gaseous part, such as in the natural gas production or combustion field, where the water is present as a liquid. The flow meter can also be configured, for example, as a measuring turbine or Coriolis meter. Different designs of the interconnected containers or tubes are also conceivable. Reference should also be had to the appended claims.

| LIST OF REFERENCE NUMERALS | |
| --- | --- |
| 10 | First container |
| 12 | Second container |
| 14 | Measuring tube |
| 16 | Inlet |
| 17 | Two-phase mixture |
| 18 | Condensate |
| 20 | Inclined plane |
| 22 | First, upper outlet |
| 24 | Fine mesh screen/sieve/net |
| 26 | Second outlet |
| 28 | Inlet |

LIST OF REFERENCE NUMERALS

| | |
|---|---|
| 30 | Outlet opening |
| 32 | Drain |
| 34 | First bottom (of first container 10) |
| 36 | Second bottom (of second container 12) |
| 38 | Edge |
| 40 | Flow meter |
| 42 | Sensor |
| 44 | Sensor |
| 46 | First level sensor |
| 48 | Second level sensor |
| 50 | Heat exchanger |
| 52 | Overflow |
| 54 | Inner circumferential surface (of first container 10) |
| 56 | Outer circumferential surface (of second container 12) |
| 58 | Outer shell surface |
| 60 | Inclined plane |
| 62 | Downstream end |
| 64 | Groove |

What is claimed is:

1. A separation system for a fuel cell system, the separation system comprising:
   a first container which is open to a top for separating a liquid from a two-phase mixture, the first container comprising an inlet via which the two-phase mixture is suppliable, a first upper outlet via which a gas is dischargeable, a second lower outlet via which a liquid is dischargeable, and a first container bottom;
   a second container which is open at a top, the second container comprising an inlet, a drain which comprises an outlet opening, and a second container bottom;
   a measuring tube which fluidically connects the second lower outlet of the first container to the inlet into the second container so that the first container and the second container are communicating containers in which a liquid level is on an equipotential line in both the first container and in the second container; and
   a flow meter which is configured to measure a flow in the measuring tube between the first container and the second container geodetically below the outlet opening, wherein,
   the outlet opening of the drain of the second container is arranged geodetically above the first container bottom and above the second container bottom.

2. The separation system as recited in claim 1, wherein the flow meter is an ultrasonic sensor.

3. The separation system as recited in claim 1, wherein the inlet into the first container is arranged geodetically above the outlet opening in the second container.

4. The separation system as recited in claim 3, wherein the first container further comprises an inclined plane which is arranged to descend from the inlet of the first container in a direction of the second lower outlet of the first container, the inclined plane being arranged in the first container below the inlet of the first container and geodetically above the outlet opening of the second container.

5. The separation system as recited in claim 1, wherein the measuring tube is configured to rise from the first container to the second container.

6. The separation system as recited in claim 1, wherein the first container further comprises a net, a screen or a mesh which is arranged at the first upper outlet of the first container.

7. The separation system as recited in claim 1, wherein the first container is arranged concentrically to the second container.

8. The separation system as recited in claim 7, wherein the second container is arranged radially within the first container.

9. The separation system as recited in claim 8, wherein the measuring tube comprises a downstream end which is arranged to extend through the first container to the inlet of the second container.

10. The separation system as recited in claim 1, wherein a geodetical lower portion of the outlet opening is configured to be non-continuous.

11. The separation system as recited in claim 1, wherein,
   the outlet opening comprises an edge, and
   the edge is arranged on an equipotential line which is interrupted by at least one groove.

12. The separation system as recited in claim 1, further comprising:
   a first level sensor which is arranged in the first container.

13. The separation system as recited in claim 12, further comprising:
   a second level sensor which is arranged in the second container.

14. The separation system as recited in claim 1, further comprising:
   an overflow which is arranged between the first container and the second container geodetically above the outlet opening of the second container.

15. The separation system as recited in claim 1, further comprising:
   a heat exchanger which is arranged upstream of the second container.

* * * * *